United States Patent Office 3,116,328
Patented Dec. 31, 1963

3,116,328
PREPARATION OF THIURAM DISULFIDES
William L. Cox, Mount Prospect, and Alexander Gaydasch, Chicago, Ill., assignors to Universal Oil Products Company, Des Plaines, Ill., a corporation of Delaware
No Drawing. Filed May 11, 1961, Ser. No. 109,249
8 Claims. (Cl. 260—567)

This invention relates to a novel process for the preparation of thiuramdisulfides. More particularly, this invention relates to the preparation of tetraalkylthiuramdisulfides by the catalytic oxidation of an alkali salt of a dialkyldithiocarbamic acid.

The thiuramdisulfides, to which the process of this invention relates, are compounds which have found extensive application, principally as accelerators to improve the vulcanization of synthetic as well as natural rubber compounds, but also as fungicides and insecticides. The compounds referred to are for the most part alkyl derivatives of thiuramdisulfides of which bis(N,N-dimethylthiocarbamyl) disulfide, bis(N,N-diethylthiocarbamyl) disulfide, bis)N,N-diisopropylthiocarbamyl) disulfide, and bis(N,N-dibutylthiocarbamyl) disulfide are among the more important. Bis(N,N-diethylthiocarbamyl) disulfide for example, may be utilized without additional sulfur as a vulcanizing agent or with sulfur as an ultra accelerator as well as an activator for thiazole type accelerators. Bis(N,N-diethylthiocarbamyl) disulfide also causes vulcanizates to be non-staining, non-discoloring, and exceptionally resistant to heat aging.

It is an object of this invention to present an improved process for the preparation of tetraalkylthiuramdisulfides.

It is another object of this invention to present an economic, commercially practicable process for the preparation of tetraalkylthiuramdisulfides by the catalytic oxidation of an alkali salt of a dialkyldithiocarbamic acid in the presence of a novel catalyst therefor, utilizing readily available reactants of a comparatively non-hazardous nature.

In one of its broader aspects this invention embodies a process for the preparation of a hydrocarbon substituted thiuramdisulfide which comprises oxidizing an alkali salt of a hydrocarbon substituted dithiocarbamic acid in the presence of a phthalocyanine catalyst at a pH of from about 7 to about 12 and recovering the resulting hydrocarbon substituted thiuramdisulfide.

Another embodiment is in a process for the preparation of an alkyl substituted thiuramdisulfide which comprises oxidizing an alkali salt of an alkyldithiocarbamic acid in the presence of a group VIII metal phthalocyanine catalyst at a pH of from about 7 to about 12 and recovering the resulting alkyl substituted thiuramdisulfide.

A further embodiment is in a process for the preparation of a tetraalkylthiuramdisulfide which comprises oxidizing the sodium salt of a dialkyldithiocarbamic acid in aqueous solution with an oxygen-containing gas in the presence of an iron group metal phthalocyanine catalyst at a pH of from about 7 to about 12 and recovering the resulting tetraalkylthiuramdisulfide.

A specific embodiment is in a process for the preparation of bis(N,N-diethylthiocarbamyl) disulfide which comprises oxidizing the sodium salt of N,N-diethyldithiocarbamic acid in aqueous solution in the presence of air and cobalt phthalocyanine disulfonate at a pH of from about 7 to about 8.5 and recovering the resulting bis(N,N-diethylthiocarbamyl) disulfide.

Other objects and embodiments will become apparent in the following detailed description of the process of this invention.

In accordance with the process of this invention an alkali salt of a hydrocarbon substituted dithiocarbamic acid is oxidized in the presence of a phthalocyanine catalyst at a pH of from about 7 to about 12 to yield a hydrocarbon substituted thiuramdisulfide.

Hydrocarbon substituted dithiocarbamic acids, the alkali salts of which are oxidized according to the present process to yield the corresponding hydrocarbon substituted thiuramdisulfides, include N substituted as well as N,N-disubstituted dithiocarbamic acids wherein the hydrocarbon substituent is an alkyl or an aryl radical. For example, the hydrocarbon substituted dithiocarbamic acid can be an alkyldithiocarbamic acid including N-methyldithiocarbamic acid, N-ethyldithiocarbamic acid, N-n-propyldithiocarbamic acid, N-iso-propyldithiocarbamic acid, N-n-butyldithiocarbamic acid, N-sec-butyldithiocarbamic acid, N-tert-butyldithiocarbamic acid, N-amyldithiocarbamic acid, etc., as well as dialkyldithiocarbamic acids including N,N-dimethyldithiocarbamic acid, N,N-diethyldithiocarbamic acid, N,N-di-n-propyldithiocarbamic acid, N,N-diisopropylthiocarbamyl acid, N,N-di-n-butyldithiocarbamic acid, N,N-di-sec-butyldithiocarbamic acid, N,N-di-tert-butyldithiocarbamic acid, N,N-diamyldithiocarbamic acid, etc., and also N-methyl-N-ethyldithiocarbamic acid, N-methyl-N-propyldithiocarbamic acid, N-methyl-N-butyldithiocarbamic acid, N-methyl-N-amyldithiocarbamic acid, N-ethyl-N-propyldithiocarbamic acid, N-ethyl-N-butyldithiocarbamic acid, N-ethyl-N-amyldithiocarbamic acid, N-propyl-N-butyldithiocarbamic acid, N-propyl-N-amyldithiocarbamic acid, N-butyl-N-amyldithiocarbamic acid, etc. As hereinbefore indicated the hydrocarbon substituted dithiocarbamic acid can be an aryldithiocarbamic acid including N-phenyldithiocarbamic acid, N-o-tolyldithiocarbamic acid, N-m-tolyldithiocarbamic acid, N-p-tolyldithiocarbamic acid, etc., as well as diaryldithiocarbamic acids including N,N-diphenyldithiocarbamic acid, N,N-di-o-tolyldithiocarbamic acid, N,N-di-m-tolyldithiocarbamic acid, N,N-di-p-tolyldithiocarbamic acid, etc. Utilizable hydrocarbon substituted dithiocarbamic acids also include alkylaryldithiocarbamic acids, for example N-methyl-N-phenyldithiocarbamic acid, N-methyl-N-o-tolyldithiocarbamic acid, N-methyl-N-p-tolyldithiocarbamic acid, N-ethyl-N-phenyldithiocarbamic acid, N-ethyl-N-o-tolyldithiocarbamic acid, N-methyl-N-m-tolyldithiocarbamic acid, N-ethyl-N-p-tolyldithiocarbamic acid, etc.

In general, dithiocarbamic acids are unstable but can be conveniently utilized in the form of the alkali metal salt thereof. The alkali metal salts of the above-described dithiocarbamic acids can be prepared by any suitable or convenient method. One generally accepted method by which said salts are prepared involves the addition of carbon disulfide to an aqueous solution comprising an appropriate amine and an alkali metal hydroxide. For example, carbon disulfide is added to an aqueous solution of diethylamine and sodium hydroxide to yield the sodium salt of N,N-diethyldithiocarbamic acid. While the sodium hydroxide and potassium hydroxide are preferred alkali metal hydroxides it is understood that other alkali metal hydroxides may be used, including lithium hydroxide, rubidium hydroxide and cesium hydroxide, although the three last mentioned compounds are generally more expensive and accordingly are not usually employed in commercial processes.

The alkali metal salts of the aforementioned hydrocarbon substituted dithiocarbamic acids can be oxidized in accordance with the present process to yield the corresponding hydrocarbon substituted thiuramidisulfides although not necessarily with the same or equivalent results. The process of this invention is preferably directed to the oxidation of the alkali metal salts of dialkyldithiocarbamic acids to yield the corresponding tetraalkylthiuramdisulfides.

In one preferred embodiment of this invention an alkali metal salt of N,N-dimethyldithiocarbamic acid is oxidized to yield the corresponding bis (N,N-dimethylthiocarbamyl) disulfide.

In another preferred embodiment an alkali metal salt of N,N-diethyldithiocarbamic acid is oxidized to yield the corresponding bis (N,N-diethylthiocarbamyl) disulfide.

In still another preferred embodiment an alkali metal salt of N,N-diisopropylthiocarbamyl acid is oxidized to disulyield the corresponding bis (N,N-diisopropylthiocarbamyl) disulfide.

In yet another preferred embodiment an alkali metal salt of N,N-dibutyldithiocarbamic acid is oxidized to yield the corresponding bis (N,N-dibtuylthiocarbamyl) disulfide.

As hereinbefore set forth, hydrocarbon substituted thiuramdisulfides are prepared in accordance with the present process by the oxidation of an alkali metal salt of an appropriate hydrocarbon substituted dithiocarbamic acid in the presence of phthalocyanine catalyst. Any suitable phthalocyanine catalyst may be utilized, particularly metal phthalocyanine catalysts. Phthalocyanines comprising a group VIII metal are preferred and include, for example, iron phthalocyanine, cobalt phthalocyanine, nickel phthalocyanine, rhodium phthalocyanine, ruthenium phthalocyanine, palladium phthalocyanine, osmium phthalocyanine, iridium phthalocyanine, and platinum phthalocyanine. Phthalocyanines comprising an iron group metal, i.e. iron phthalocyanine, cobalt phthalocyanine, and nickel phthalocyanine, are particularly preferred. The specific phthalocyanines set forth are for illustrative purposes only and it is not intended to unduly limit the process of this invention thereto. It is understood that any suitable phthalocyanine may be employed although not necessarily with the same or equivalent results.

In general, the metal phthalocyanines are not readily soluble in aqueous alkaline solutions and therefore it is preferable to utilize a soluble derivative thereof for improved operation. Sulfonated derivatives of metal phthalocyanines are preferred. The sulfonated derivatives may be prepared in any suitable or conventional manner. For example, the sulfonate of cobalt phthalocyanine can be prepared by reacting cobalt phthalocyanine with 20% fuming sulfuric acid.

While the sulfonic acid derivatives are preferred, it is understood that other suitable derivatives may be employed in accordance with the present invention. For example, carboxylated derivatives may be utilized. They may be prepared in any suitable or conventional manner as, for example, by the action of trichloroacetic acid on the metal phthalocyanine or by the action of phosgene and aluminum chloride. In the latter reaction, the acid chloride formed is converted to the desired carboxylated derivative by conventional hydrolysis methods. However, it is understood that the various derivatives are not necessarily equivalent.

The phthalocyanine catalyst is both very active and highly stable and is utilized in exceedingly small concentrations ranging from about 5 to about 500 and preferably from about 10 to about 100 parts per million by weight of the alkali metal salt of the dithiocarbamic acid present in the solution, although lower or higher concentrations may be used in some cases. Higher concentrations are operable and may be utilized if so desired although in most cases little if any beneficial effect results therefrom.

Preparation of the desired hydrocarbon substituted thiuramdisulfide is accomplished by the catalytic oxidation of an alkali salt of an appropriate hydrocarbon substituted dithiocarbamic acid. Accordingly, an oxidizing agent is present in the reaction mixture. Air is the preferred oxidizing agent although oxygen, or other oxygen-containing gas may be utilized.

In this oxidation reaction the pH of the reaction mixture is controlled at a pH of from about 7 to about 8.5 to obtain optimum yields of the desired products. One preferred method of pH control involves the addition of acidic materials to the reaction mixture during the course of the reaction. It is preferred to utilize carbon dioxide for this purpose although other acidic materials including acetic acid, mineral acids, etc., can be utilized.

The process of this invention may be effected in any suitable or convenient manner and may comprise a batch or continuous type of operation. In a batch type of operation the alkali metal salt of the selected hydrocarbon substituted dithiocarbamic acid can be added to a suitable reaction vessel containing therein an aqueous alkaline solution and a phthalocyanine catalyst. Air may be introduced therein or bubbled therethrough at a rate and in a manner so as to insure as nearly as possible a saturated reaction mixture. The acidic materials utilized to control the pH of the reaction mixture may be added drop-wise from a dropping funnel, or, in the case of carbon dioxide, bubbled through the reaction mixture at a suitable rate. It is of course highly desirable in this type of operation that adequate means of agitation of the vessel contents be provided, for example, mechanical stirrers or other suitable mixing devices, to assure constant and intimate contact of the reactants to secure optimum conversion thereof. In a continuous process an aqueous alkaline solution of the alkali metal salt of the selected hydrocarbon substituted dithiocarbamic acid containing a phthalocyanine catalyst is continuously passed through a reaction zone countercurrent to an ascending stream of air and carbon dioxide. The product is withdrawn from the lower portion of said reaction zone.

The process of this invention can be effected at a temperature of from about 15° C. to about 200° C. although it is preferred to utilize a temperature of from about 25° C. to about 100° C. In some instances it may be desirable to effect the process of this invention in a sealed vessel in which case air, or other oxygen containing gas, is charged to the vessel and sealed therein at superatmospheric pressures to insure an adequate supply of said air or other oxygen containing gas as an oxidizing agent. Otherwise, pressure does not appear to be an important variable with relation to the present process which may be operated at atmospheric, superatmospheric or autogenous pressures as the case may require.

The following examples are presented solely for the purpose of illustrating the process of the present invention and it is not intended to thereby unduly limit the generally broad scope thereof.

*Example I*

Bis(N,N-diethylthiocarbamyl) disulfide was prepared in a batch type of process by continuously charging a stream of air through an aqueous solution comprising 171 grams of the sodium salt of N,N-diethyldithiocarbamic acid and about 100 parts per million, based on the NaOH content of said aqueous solution, of cobalt phthalocyanine disulfonate in a glass vessel. The vessel contents were subjected to continuous stirring and were maintained at a temperature of about 25° C. 2 N hydrochloric acid was added dropwise to the reaction mixture during the course of the reaction by means of a dropping funnel at a rate so as to maintain the pH of the reaction mixture at from about 7 to about 8.5. After a reaction period of about 8 hours, 120 grams of bis(N,N-diethylthiocarbamyl) disulfide which had precipitated was recovered by filtration. This product was water washed and dried and found on analysis to be substantially pure.

*Example II*

Bis(N,N-diethylthiocarbamyl) disulfide was prepared by charging an aqueous solution comprising 171 grams of the sodium salt of N,N-diethyldithiocarbamic acid, and about 100 parts per million, based on the NaOH content of said solution, of cobalt phthalocyanine disulfonate, and about 45 grams of Dry Ice to a steel rocking autoclave. The autoclave was sealed and charged to about 100 atmospheres with air. The autoclave contents were rocked at room temperature for an 8 hour period after which the autoclave was depressured and the precipitated product recovered by filtration, water washed and dried. 115 grams of bis(N,N-diethylthiocarbamyl) disulfide was recovered.

*Example III*

Air is continuously charged and dispersed through a rapidly stirred aqueous solution in a reaction vessel, said solution comprising about 145 grams of the sodium salt of N,N-dimethyldithiocarbamic acid, and about 50 p.p.m. cobalt phthalocyanine disulfonate based on the weight of said sodium salt. The pH of the resulting reaction mixture is maintained at a pH of from about 7 to about 8.5 by the addition of crushed Dry Ice during the course of the reaction. The reaction is carried to substantial completion as indicated by a constant pH with the aforesaid limits without further addition of Dry Ice. The vessel contents are filtered and the residue water-washed and dried to yield a substantially pure bis(N,N-dimethylthiocarbamyl) disulfide product.

*Example IV*

In this example air is continuously charged and dispersed through a rapidly stirred aqueous solution in a reaction vessel at a temperature of about 20–30° C. said solution comprising the sodium salt of N,N-dibutyldithiocarbamic acid, and about 100 p.p.m. iron phthalocyanine disulfonate based on the weight of said sodium salt. The pH of the resulting reaction mixture is maintained at a pH of from about 7 to about 8.5 by the addition of crushed Dry Ice during the course of the reaction. The reaction is carried to substantial completion as indicated by a constant pH within the aforesaid limits without further addition of Dry Ice. The vessel contents are filtered and the residue water-washed and dried to yield a substantially pure bis(N,N-dibutylthiocarbamyl) disulfide product.

*Example V*

In this example air is continuously charged and dispersed through a rapidly stirred aqueous solution in a reaction vessel at a temperature of about 20–30° C., said solution comprising the sodium salt of N,N-diisopropylthiocarbamyl acid, and about 100 p.p.m. cobalt phthalocyanine disulfonate based on the weight of said sodium salt. The pH of the resulting reaction mixture is maintained at a pH of from about 7 to about 8.5 by the addition of crushed Dry Ice during the course of the reaction. The reaction is carried to substantial completion as indicated by a constant pH within the aforesaid limits without further addition of Dry Ice. Vessel contents are filtered and the residue water-washed and dried to yield a substantially pure bis(N,N-diisopropylthiocarbamyl) disulfide product.

We claim as our invention:

1. A process for the preparation of an alkyl substituted thiuramdisulfide which comprises oxidizing an alkali metal salt of an alkyldithiocarbamic acid with an oxidizing agent selected from the group consisting of oxygen and air in the presence of a group VIII metal phthalocyanine catalyst at a pH of from about 7 to about 12 and a temperature of from about 15° C. to about 200° C., and recovering the resulting alkyl substituted thiuramdisulfide.

2. A process for the preparation of a tetraalkylthiuramdisulfide which comprises oxidizing the sodium salt of a dialkyldithiocarbamic acid in aqueous solution with air in the presence of a group VIII metal phthalocyanine catalyst at a pH of from about 7 to about 12 and a temperature of from about 15° C. to about 200° C., and recovering the resulting tetraalkylthiuramdisulfide.

3. A process for the preparation of an alkyl substituted thiuramdisulfide which comprises oxidizing an alkali metal salt of an alkyldithiocarbamic acid with an oxidizing agent selected from the group consisting of oxygen and air in the presence of cobalt phthalocyanine disulfonate at a pH of from about 7 to about 12 and a temperature of from about 15° C. to about 200° C., and recovering the resulting alkyl substituted thiuramdisulfide.

4. A process for the preparation of bis(N,N-diethylthiocarbamyl) disulfide which comprises oxidizing the sodium salt of N,N-diethyldithiocarbamic acid in aqueous solution in the presence of air and cobalt phthalocyanine disulfonate at a pH of from about 7 to about 8.5 and a temperature of from about 15° C. to about 200° C., and recovering the resulting bis(N,N-diethylthiocarbamyl) disulfide.

5. A process for the preparation of bis(N,N-dimethylthiocarbamyl disulfide which comprises oxidizing the sodium salt of N,N-dimethyldithiocarbamic acid in aqueous solution in the presence of air and cobalt phthalocyanine disulfonate at a pH of from about 7 to about 8.5 and a temperature of from about 15° C. to about 200° C., and recovering the resulting bis(N,N-dimethylthiocarbamyl) disulfide.

6. A process for the preparation of bis(N,N-diisopropylthiocarbamyl) disulfide which comprises oxidizing the sodium salt of N,N-diisopropylthiocarbamyl acid in aqueous solution in the presence of air and cobalt phthalocyanine disulfonate at a pH of from about 7 to about 8.5 and a temperature of from about 15° C. to about 200° C., and recovering the resulting bis(N,N-diisopropylthiocarbamyl) disulfide.

7. A process for the preparation of bis(N,N-dibutylthiocarbamyl) disulfide which comprises oxidizing the sodium salt of N,N-dibutyldithiocarbamic acid in aqueous solution in the presence of air and cobalt phthalocyanine disulfonate at a pH of from about 7 to about 8.5 and a temperature of from about 15° C. to about 200° C., and recovering the resulting bis(N,N-dibutylthiocarbamyl) disulfide.

8. A process for the preparation of bis(N,N-diethylthiocarbamyl) disulfide which comprises oxidizing the sodium salt of N,N-diethyldithiocarbamic acid in aqueous solution in the presence of air and iron phthalocyanine disulfonate at a pH of from about 7 to about 8.5 and a temperature of from about 15° C. to about 200° C., and recovering the resulting bis(N,N-diethylthiocarbamyl) disulfide.

References Cited in the file of this patent

UNITED STATES PATENTS

| | | |
|---|---|---|
| 2,464,799 | Eaton | Mar. 22, 1949 |
| 2,859,246 | Martin et al. | Nov. 4, 1958 |
| 2,879,262 | Sullivan | Mar. 24, 1959 |

FOREIGN PATENTS

| | | |
|---|---|---|
| 801,387 | Great Britain | Sept. 10, 1958 |

OTHER REFERENCES

Cook: J. Chem. Soc. (London), volume of 1938, pp. 1768–1780.

Paquot: Comptes rend. vol. 209, pp. 171–173 (1939).